Sept. 26, 1961  E. A. ANDERSON ET AL  3,001,292
ARTICLE CHECKING AND MACHINING FIXTURE
Filed Aug. 8, 1958  2 Sheets-Sheet 1

INVENTORS
EDWARD A. ANDERSON
CECIL W. WALTON
BY Hudson, Boughton,
Williams, David & Hoffmann
ATTORNEYS Sept. 26, 1961 E. A. ANDERSON ET AL 3,001,292
ARTICLE CHECKING AND MACHINING FIXTURE
Filed Aug. 8, 1958 2 Sheets-Sheet 2

INVENTORS
EDWARD A. ANDERSON
CECIL W. WALTON
BY
Hudson, Boughton,
Williams, David & Hoffmann
ATTORNEYS United States Patent Office 3,001,292
Patented Sept. 26, 1961

3,001,292
ARTICLE CHECKING AND MACHINING FIXTURE
Edward A. Anderson, Cleveland Heights, and Cecil W. Walton, Lakewood, Ohio, assignors to The Lamson & Sessions Company, Cleveland, Ohio, a corporation of Ohio
Filed Aug. 8, 1958, Ser. No. 753,899
3 Claims. (Cl. 33—174)

This invention relates to article holding or checking devices or fixtures by which an article can be checked or inspected as to its accuracy and can also be held for machining thereof.

When metal working dies are received from a die maker or manufacturer they often contain errors which, if not detected, may result in irregular or unsatisfactory product articles being produced from those dies and, if high-quantity production is being achieved, considerable loss or damage can result. In the case of thread rolling dies or the like such error often is present in the angular relation of the thread forming elements to the side faces of the dies and, as a result of this error, the threads of the threaded articles produced will have an incorrect helix angle.

The present invention accordingly provides an article holding or checking device, hereinafter conveniently referred to as a fixture, by which various kinds of articles can be checked or inspected as to the accuracy of the angular relation between certain portions thereof but which will be especially useful in checking thread rolling dies and the like, the fixture being also useful for holding the article, which has been thus checked, for machining thereof to eliminate the error detected.

Another object is to provide a novel fixture, of the kind and for the purpose above indicated, having a reference portion and an article carrier or support swingable to a geometrically determinable position for locating a given portion of the article in an accuracy-comparison relation to the reference portion of the fixture.

A further object is to provide a novel fixture of the character mentioned above and wherein the swingable article carrier is a bar or the like, preferably a so-called "sine bar," and has article positioning means thereon adapted for co-operation with an angularly disposed portion of the article being checked, such as with the thread forming elements of a thread rolling die.

Still another object is to provide such a novel fixture in which gauge blocks of high accuracy can be readily used in the swingeable positioning of the article carrier at a predetermined position angle or tilt, and which includes locking means so disposed as to retain the article carrier in its adjusted position without disturbing the accuracy of the setting.

Additionally, this invention provides a novel fixture of the kind referred to above and which includes gauge means, or gauge and indicator means, for making the accuracy comparison between the positioned article and the reference portion of the fixture.

Other objects and advantages of this invention will be apparent in the following detailed description, and in the accompanying sheets of drawings forming a part of this specification and in which, FIG. 1 is a front elevation of the fixture with a phantom-line representation of the article, and showing the fixture prior to the swinging of the article carrier to the checking position, the gauge and indicator means of the fixture being removed therefrom;

FIG. 4 is a partial section taken through the fixture at the location of the pivot means of the article carrier, as indicated by section line 4—4 of FIG. 1;

FIG. 5 is another partial section taken through co-operating positioning elements for the swingable article carrier as indicated by section line 5—5 of FIG. 3;

FIG. 6 is a perspective view showing a locking member of the fixture in detached relation.

Figure 1:
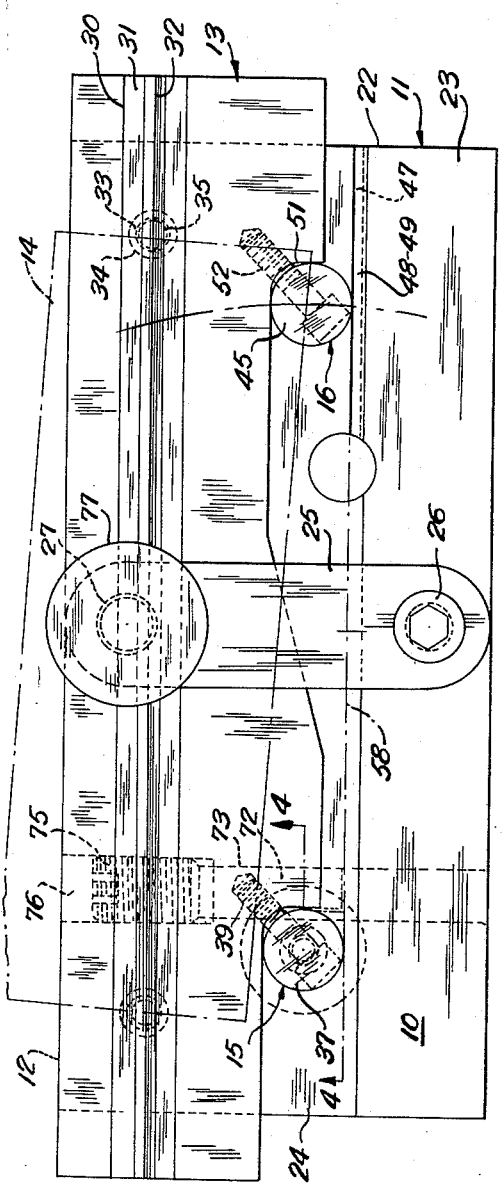

As a practical embodiment of this invention the drawings show an article checking and holding device or fixture 10 which comprises, in general, a frame or body 11 having a reference portion or surface 12 thereon, and an article support or carrier 13 adapted to have an article 14 mounted thereon for positioning relative to the reference portion. The fixture 10 also comprises pivot means 15 by which the carrier 13 is swingably connected with the frame 11, and contact means 16 effective between the frame 11 and the carrier 13 for setting the latter at a predetermined position angle or tilt to thereby orient or locate the article 14 in an accuracy-comparison relation to the reference portion 12.

The fixture 10 can be used in the checking or inspecting of various kinds of articles and as a holder for a checked article during machining thereof. It is particularly useful for accomplishing these functions in connection with conventional thread rolling dies and the like. The fixture 10 is accordingly disclosed herein with reference to such a conventional thread rolling die as the article 14 shown in the drawing.

Figure 7:
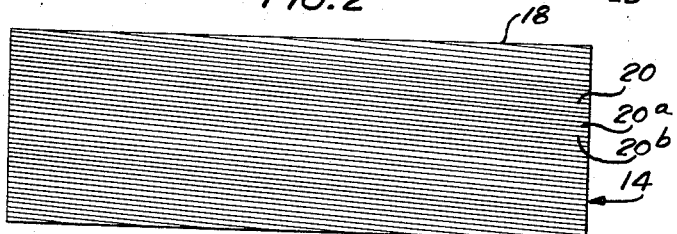
FIG. 7 is a plan view of a thread rolling die as being representative of the article to be checked.

As represented in FIG. 7, such a conventional thread rolling die 14 comprises a hardened metal block having parallel flat longitudinal side faces 18 and 19 and also having, on the front face thereof, a plurality of thread-forming elements extending in an inclined or angular relation to the side faces 18 and 19. The thread-forming elements 20 comprise straight parallel longitudinally extending ridge and groove elements 20ª and 20ᵇ which form the thread grooves and ridges on the screw products for which the thread rolling die 14 is to be used. The angular inclination of the thread-forming elements 20 is extremely important in such a thread rolling die because it determines or provides the helix angle of the thread convolutions of the screw product produced. If the inclination of the thread-forming elements 20 relative to the side faces of the die is not accurate, the helix angle in the resulting product will be faulty and the product will be unsatisfactory and may need to be scrapped.

If the angular inclination of the thread-forming elements 20 of the die 14 as received from the die maker is inaccurate, the die can still be rendered satisfactory and serviceable by a further or final machining thereof to correct such error. The fixture 10 of the present invention makes possible the checking of the thread rolling die 14 to determine whether there is inaccuracy in the angular inclination of the thread forming elements 20 and serves to hold the die for such a further or final machining thereof to correct such inaccuracy.

The frame 11 comprises a generally L-shaped frame member 22 having a horizontal plate or base portion 23 on which the fixture is adapted to rest and an upright wall or leg 24 disposed at right angles to the base 23 and rising thereabove. The horizontal top surface of the upright leg 24 forms the above-mentioned reference portion 12 of the fixture. The frame 11 is also provided at the front thereof with an upright arm or bracket portion 25 which is located in spaced relation to the upright leg 24 and is secured to the base 23 as by means of a screw 26. The arm 25 forms a support for a clamping screw 27 which cooperates with the die 14 in a manner to be explained hereinafter.

The article support or carrier 13 is an elongated bar-like member lying against or adjacent the front face of the upright leg 24 and swingably movable thereacross for positioning or orienting the die 14 relative to the straight flat reference surface 12. The carrier 13 is provided with a longitudinal slot 30 in the front face thereof and has a positioning member 31 in the form of an insert mounted in the slot for co-operating engagement with the die 14. The form of the insert 31 can be varied to suit the particular shape of the article to be mounted on the carrier 13 and, when the article is a thread rolling die having the above-described thread-forming elements 20 thereon, the insert is formed with a V-shaped longitudinal ridge 32 on the front thereof for co-operating engagement of its apex in one of the grooves $20^b$ of the die.

To assure good co-operative engagement between the insert 31 and the die 14, the insert is preferably shiftable in the slot 30 under the influence of suitable compression springs 33 located in spring pockets 34 of the carrier 13. The spaced side walls of the slot 30 form guide surfaces which are slidably engaged by the insert 31, the latter being here shown in the form of an elongate insert member of a generally quadrangular cross-sectional shape. The insert 31 is retained in the slot 30 by suitable screws 35 mounted in holes of the carrier 13 and having threaded engagement with the insert. The retaining screws 35 are here shown as being located on the carrier 13 so as to extend coaxially of the springs and spring pockets 33 and 34.

The pivot means 15 comprises a pivot shaft 37 rockable in a bore 38 provided in the leg 24 of the frame 11. The carrier 13 is secured on the pivot shaft 37 by suitable attaching screws 39. The carrier 13 is maintained in an adjacent relation to the front face of the leg 24 by means of the pivot shaft 37 and, for this purpose, the pivot shaft is held against withdrawal from the bore 38 by means of a head 40 located in a counterbore 41 and secured to the pivot shaft by an attaching screw 42.

Figure 3:
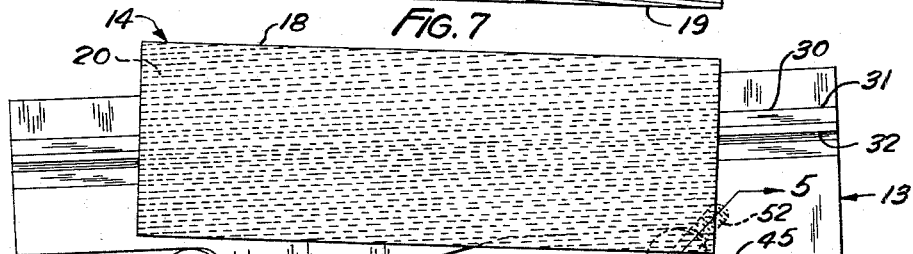
FIG. 3 is a partial front elevation somewhat diagrammatic in form and further showing the adjusted position of the article resulting from the swinging of the article carrier to a predetermined position angle.

The contact means 16 for swingably positioning the carrier 13 relative to the frame 11 comprises co-operating contact members or elements 44 and 45 on the base and carrier respectively. One of the contact members, in this case the contact member 45, is a movable contact member movable with the carrier 13 and the other contact member is a stationary abutment means 44 engageable by the movable contact member. The frame 11 is so constructed that the abutment means 44 may comprise a gauge block, or a group of gauge blocks, of a conventional form removably mounted on the base 23. Such gauge blocks are readily available in different thicknesses in die shops and manufacturing plants and have a high degree of accuracy. FIGS. 3 and 5 of the drawings show a group of such gauge blocks $44^a$ and $44^b$ of different thicknesses as forming the abutment means 44.

To accommodate the abutment means 44, the base 23 is provided with a longitudinal slot 47 located beneath the contact member 45 of the carrier 13 and disposed between a pair of flat parallel lands 48 and 49. The width of the slot 47 is such as to snugly receive a gauge block or a stack of gauge blocks, as the case may be, to provide the predetermined thickness or height required for the abutment means 44 for the proper positioning or tilt of the carrier 13. The slot 47 is preferably of a predetermined depth, such as 100 thousandths of an inch, and when there are no gauge blocks in the slot and the lands 48 and 49 are engaged by the contact member 45, the abutment height and the tilt angle of the carrier 13 will each be of zero value.

The contact member 45 of the carrier 13 can be of any desired shape and is here shown as being a cylindrical member secured in a transverse concave recess 51 of the carrier by suitable attaching screws 52. Because of its cylindrical shape the contact member 45 will engage the surface of the abutment means 44 or the surface of the lands 48 and 49, as the case may be, with a line contact.

In the fixture 10 the co-operating contact members of the contact means 16 are so provided that the abutment means 44 is of a predetermined height and forms the stationary contact member and is located on the base 23, whereas the contact member engageable therewith is the movable contact member 45 mounted on the carrier 13. If desired, however, this arrangement can be reversed; that is to say, an abutment member of predetermined height can be the movable contact member carried by the article support 13 and the engageable contact member can be the stationary contact member provided on the base 23.

Figure 2:
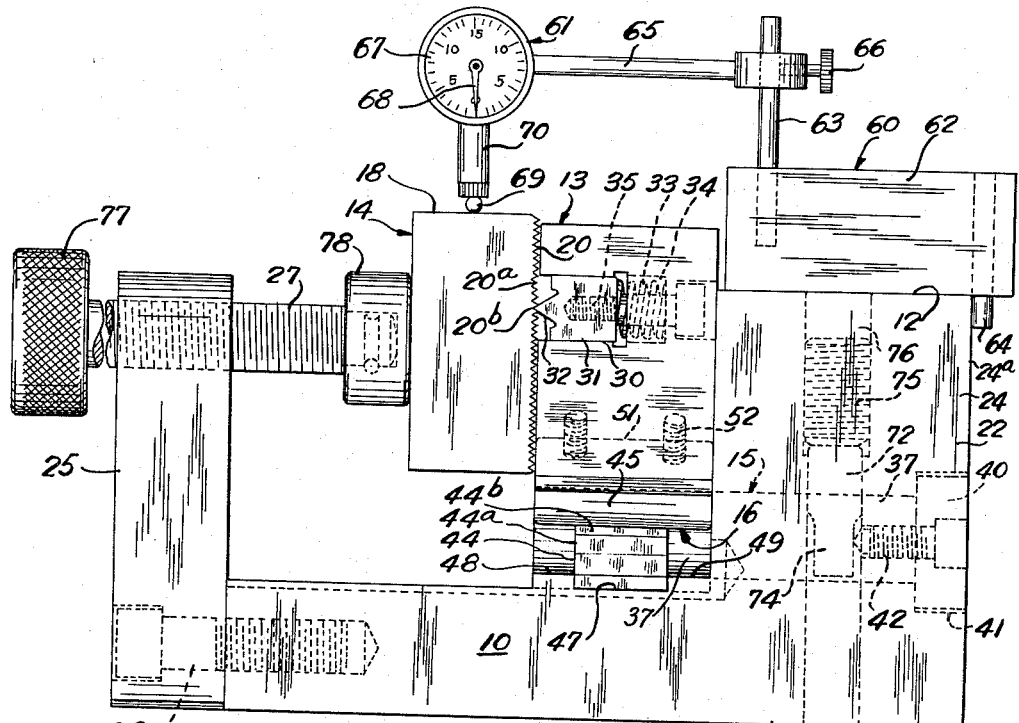
FIG. 2 is an end elevation of the fixture showing the article as having been moved to the checking position by the article carrier, and also showing the gauge and indicator means of the fixture in an operative position thereon.

To explain the use of the fixture 10 in checking the accuracy of the die 14, it is pointed out that the die is placed on the carrier 13 with the apex of the insert 31 engaged in a groove of the die and the die is held against the carrier and in such engaged relation with the insert thereof, by the clamping screw 27. When the die has been thus mounted on the carrier 13 one of its side faces, in this instance the side face 18, will be exposed along the top of the fixture. FIG. 1 of the drawings shows the die 14 in phantom lines in this general location and in a tilted position such as the die would assume when the carrier 13 is in its initial or horizontal position, that is, in an initial position prior to the swinging of the carrier through a predetermined position angle by the introduction of the abutment means 44 of predetermined height under the movable contact member 45. FIGS. 2 and 3 of the drawings are representative of the condition of the fixture 10 after the abutment means 44 of predetermined height has been introduced into the fixture and the contact member 45 of the carrier 13 is in engagement therewith.

To further explain the use of the fixture 10 it is pointed out that, in each thread rolling die 14, the angular relation of the thread-forming elements 20 to the side face 18 is a definite angular relation whose value depends upon the helix angle of the particular screw product for which the die is to be used. If it is assumed that the die 14 is one to be used in producing ¼" x 20 screws, that is a screw of ¼" nominal diameter and having 20 threads per inch, the helix angle for this particular screw is 4° and 11'. The checking function to be performed by the fixture 10 is therefore to determine whether the thread-forming elements 20 have such an inclination of 4° and 11' relative to the side face 18. Since the helix angle of the particular die to be checked is always known to the operator using the fixture 10, the desired positioning or orientation of the die 14 is an accuracy-comparison relation to the reference surface 12 can be achieved by the use of an abutment means 44 whose predetermined height is a trigonometric function of the position angle.

Thus, from the above-described construction of the fixture 10, it will be recognized that the known position angle and the predetermined or known straight-line distance between the pivot means 15 and the contact means 16 can be used as elements of a right triangle 54 (see FIG. 3) in such a manner that the trigonometric determination of another element of the triangle will give the operator the value of the predetermined height needed for the abutment means 44 for obtaining the proper tilt of the carrier 13 for bringing the side face 18 of the die 14 into the desired accuracy-comparison relation to the reference surface 12.

In the triangle 54 thus made use of in the fixture 10, the side 55 is the altitude of the triangle and the determination of this altitude will be the predetermined height needed for the abutment means 44. The known helix angle of the die 14 is used as the position angle to which the carrier 13 is to be tilted and, in the triangle 54, is the acute angle 56 which is located opposite to or subtended by the altitude 55. The hypotenuse 57 of the triangle 54 is the predetermined straight-line distance between the pivot means 15 and the contact means 16 and is of a known value inasmuch as the fixture 10 is constructed with these components spaced apart by this known straight-line distance. The top surfaces of the lands 48 and 49 lie in a plane which is tangent to the cylindrical pivot shaft 37 and is represented by the base line 58 of the triangle 54.

For purposes of a specific example it can be assumed that the fixture 10 has been so constructed that the hypotenuse 57 is five inches long. Therefore, since the acute angle 56 and the hypotenuse 57 of the right triangle 54 are known values, namely 4° and 11′ and 5 inches respectively, the value of the altitude 55, that is, the predetermined height needed for the abutment means 44, can be readily determined as being the product of the sine of the angle 56 and the hypotenuse 57 or, in other words, the product of .07295 x 5″ which is .3647″. The operator therefore selects a gauge block, or a combination of blocks, having the necessary thickness or aggregating the necessary thickness to provide the proper height for the abutment means 44. In this case, where the slot 47 has a depth of 100 thousandths of an inch, the gauge blocks assembled under the movable contact member 45 should aggregate a thickness of .46475 above the bottom of the slot.

Although the determination of the height of the abutment means 44 has been described above by using the product of the hypotenuse 57 and the sine of the angle 56, the height of the abutment means can also be determined by the use of the product of the base 58 of the triangle 54 and the tangent of the angle 56 when the predetermined straight-line distance between the pivot means 15 and the contact means 16 is measured along the base of the triangle 54. For reasons of accuracy, it is preferable, however, to construct the fixture 10 with the known straight-line distance between the pivot means 15 and the contact means 16 extending along the hypotenuse 57 of the triangle 54 because, in that case, this known distance is between two points located on the same subassembly or unit, that is to say between points located on the pivot shaft 37 and the contact member 45, both of which are secured on the carrier 13 in a fixed relation thereto, whereas the predetermined straight-line distance if measured along the base 58 would extend between the pivot shaft 37 which is a part of the carrier 13 and the abutment means 44 which is a part of the base 23.

To continue the explanation of the use of the fixture 10, it is pointed out that when the carrier 13 has thus been tilted to the position angle 56, the side face 18 of the die 14 should, if the die is accurate, extend in exact parallelism with the reference surface 12. The matter of such parallelism is determined by a portion of the fixture comprising a gauge 60 and an associated indicator 61.

The gauge 60 can be of a conventional form and comprises a block 62 resting on and slidable along the reference surface 12 and a support post 63 rising from the block. The block 62 can be guided during its movement along the reference surface 12 by a pair of guide pins 64 depending from the block and movable along the rear surface 24ª of the frame 11. The gauge 60 also comprises a support arm 65 mounted on the post 63 and secured thereon at a desired elevation as by means of a clamping screw 66.

The indicator 61 is of a conventional form comprising a graduated dial 67 and a swingable pointer 68 movable relative to the dial and actuatable by a feeler 69 movable in and projecting from a stem 70. The indicator 61 is suitably mounted on the support arm 65 and, by appropriate adjustment of the arm on the support post 63, the feeler 69 can be brought into contact with the side face 18 of the die 14. When such a sensing contact of the feeler on the surface 18 has been established, the position of the pointer 68 relative to the graduations of the dial 67 is noted by the operator.

To complete the checking operation the operator slides the gauge 60 along the reference surface 12, thereby causing the feeler 69 of the gauge 60 to move along the side face 18 of the die 14. If the face 18 is in exact parallelism with the reference surface 12, the pointer 68 of the gauge 60 will remain stationary. If the face 18 is not parallel with the reference surface 12, that fact will be indicated by movment of the pointer 68 and the extent of the movement of the pointer will indicate the amount by which the surface is out of parallelism or, in other words, the amount of error existing in the die 14.

When the existing error has thus been determined, the die 14 can be subjected to a further or final machining operation, such as a grinding operation on the face 18, to bring the same into exact parallelism with the reference surface 12. The die 14 will then be accurate for the production of screw products in which the helix angle of the screw thread will exactly correspond with the nominal helix angle for the particular screw being produced.

The fixture 10 is of a construction such that it can be used to hold the die 14 for the above-mentioned further or final machining thereof, such that it will not be necessary to remove the inspected die from the fixture and reset the die in the machine in which the final machining is to be carried out. The construction of the fixture 10 is accordingly such that when the carrier 13 has been set at the specified position angle by the placing of the abutment means 44 of predetermined height under the contact member 45, the carrier can be locked against accidental shifting out of its set position and the die 14 can then be clamped in a fixed relation on the carrier by the screw 27.

The locking means for the carrier 13 is here shown as comprising a locking shoe 72 in the form of a pin inserted into a passage 73 of the frame 11. The locking pin 72 is of a size to substantially fit and be slidable in the passage 73 and has a flat surface 74 formed thereon for a portion of its length and which can be wedged against the periphery of the pivot shaft 37 as shown in FIG. 4. The passage 73 is located so that the locking pin 72 will engage the pivot shaft 37 on the side thereof facing the contact member 45 of the carrier 13, so that when the locking pin is wedged into holding engagement with the pivot shaft, any tendency to cause swinging of the carrier 13 will be resisted by the abutment means 44 and no appreciable error will be introduced by the locking action of the pin. The lock pin 72 can be thus wedged into locking engagement with the pivot shaft 37 by an actuating screw 75 having a threaded engagement with the frame 11 in a counterbore 76 into which the upper end of the pin 72 projects, as shown in FIG. 1.

The tightening of the clamping screw 27 can be facilitated by a knurled actuating knob 77 provided thereon. Accidental displacement of the die 14 on the carrier 13 by the tightening of the clamping screw 27 is minimized or avoided by providing this screw with a pad 78 for engagement with the die and which pad permits rotation of the end of the screw 27 therein.

From the accompanying drawings and the foregoing detailed description it will now be readily understood that this invention provides an article checking and holding fixture by which the accuracy of an article, such as a thread rolling die, can be readily determined and which fixture can also be used as a holder for the inaccurate article in carrying out a further or final machining of the article to correct the inaccuracy thereof. Since the characteristic features and advantages of the fixture 10 have already been explained in the foregoing specification, they need not be here repeated.

Although the novel article checking and holding fixture of this invention has been illustrated and described herein to a somewhat detailed extent, it will be understood, of course, that the invention is not to be regarded as being limited correspondingly in scope but includes all changes and modifications coming within the terms of the claims hereof.

Having described our invention, we claim:

1. A device for use in checking a thread rolling die or the like having a side face and coextending ridge and groove die elements extending in an angular relation to said side face, comprising a frame having a reference surface thereon, a sine bar having a longitudinal guide slot therein, pivot means connecting said bar with said frame for swinging relative thereto, positioning means comprising an insert member slidable in said slot and having a longitudinal ridge projection engageable in at least one of said die element grooves for locating the die on said bar at a predetermined position angle, spring means biasing said insert member in a direction to extend said ridge projection from said slot, holding means engageable with the die for retaining the same at the position angle established therefor on said bar by said insert member, contact means on said bar, and abutment means of a predetermined height on said frame and engageable by said contact means at a contact point spaced a predetermined distance from said pivot means, said height being equal to the product of said predetermined distance and a trigonometric function of said position angle whereby said die is positioned by said bar with said side face located in an accuracy comparison relation to said reference surface.

2. A device for use in checking and machining a thread rolling die or the like having a side face and coextending ridge and groove die elements extending in an angular relation to said side face, comprising a frame having thereon a base line portion and a reference surface which is parallel to said base line portion, a sine bar having a longitudinal guide slot therein, a pivot member rigid with said bar for swingably connecting the latter with said frame and providing a given point lying in the plane of said base line portion, positioning means on said bar comprising an insert member slidable in said slot and having a longitudinal ridge projection engageable in at least one of said die element grooves for locating the die on said bar at a predetermined position angle, spring means biasing said insert member outwardly of said slot for causing the engagement of said ridge projection in said one die element groove, a contact means rigid with said bar and providing a contact point spaced a straight-line distance of predetermined length from said pivot means, abutment means on said frame extending for a predetermined height above said plane and engageable by said contact means for locating said bar in a condition of tilt equal to said position angle, said abutment means comprising gauge block means and said predetermined height being equal to the product of said predetermined distance and the sine of said position angle whereby said die is positioned by said bar with said side face located in an accuracy comparison relation to said reference surface, means for making said accuracy comparison comprising gauge means having one portion in contact with said reference surface and another portion engageable with said side face of the die, and clamping means engaging said die for retaining the same in its comparison relation position for machining of said side face while the die remains in said device.

3. A device as defined in claim 2 wherein said pivot member is rockable in said frame, and wherein locking means is effective on said bar through said pivot member, said locking means comprising a wedge member movable in said frame and having a tapered portion in thrust engagement with said pivot member tangentially of the latter and on the side of the latter facing said contact means.

References Cited in the file of this patent

UNITED STATES PATENTS

| | | |
|---|---|---|
| 1,308,451 | Schachat | July 1, 1919 |
| 1,366,396 | Loeffler | Jan. 25, 1921 |
| 1,551,995 | Lovenston | Sept. 1, 1925 |
| 1,862,146 | Hoke | June 7, 1932 |
| 2,324,476 | Becker | July 20, 1943 |
| 2,359,018 | Balk | Sept. 26, 1944 |
| 2,378,743 | Wisne | June 19, 1945 |
| 2,399,624 | Bunch | May 7, 1946 |
| 2,425,381 | Lovick | Aug. 12, 1947 |
| 2,733,702 | Barrett | Feb. 7, 1956 |
| 2,803,064 | Eisele | Aug. 20, 1957 |
| 2,930,132 | Muench | Mar. 29, 1960 |

FOREIGN PATENTS

| | | |
|---|---|---|
| 582,833 | Great Britain | Nov. 28, 1946 |